INVENTOR
ERNEST R. ZABOLOTNY

United States Patent Office 3,753,881
Patented Aug. 21, 1973

3,753,881
ELECTROLYTIC PROCESS FOR DESTRUCTION
OF ODOROUS IMPURITIES
Ernest R. Zabolotny, Syracuse, N.Y., assignor to
Carrier Corporation, Syracuse, N.Y.
Filed Sept. 4, 1970, Ser. No. 69,802
Int. Cl. B01k 1/00; C01d 7/34
U.S. Cl. 204—130                                         7 Claims

ABSTRACT OF THE DISCLOSURE

A process for removing pollutant impurities and destroying oxidizable pollutant impurities in a gas stream comprises contacting the gas stream with an electrolytically regenerable liquid stream capable of oxidizing the pollutant impurities carried therein, separating the gas stream and the liquid stream and electrolytically regenerating the liquid stream whose oxidizing capability is reduced due to the destruction of pollutant impurities. The electrolytically regenerable liquid stream is recycled for further contacting with additional pollutant impurities. The specific improvement in such a process comprises subjecting the liquid stream, either on a periodic or continuous basis, to a low temperature crystallization whereby pollutant impurities which accumulate in the system and certain oxidation products can be crystallized from the liquid stream, e.g., nitrogenous contaminants. Destruction of oxidizable pollutant impurities also occurs at the electrodes of the regeneration means.

Apparatus for removing pollutant impurities and destroying oxidizable pollutant impurities carried in a gas stream comprises contact means to provide good mass transfer between the pollutants in the gas stream and an electrolytically regenerable liquid stream capable of oxidizing the pollutant impurities, electrolytic regeneration means for the liquid stream which will regenerate the oxidizing capablity of the electrolytically regenerable liquid stream, and crystallization means which will remove pollutant impurities and certain oxidation products which accumulate in the electrolytically regenerable liquid stream and which are not totally oxidized.

BACKGROUND OF THE INVENTION

Field of the invention

The present invention relates to a process and apparatus for the removal and destruction of odorous or pollutant materials in a gas stream, and more specifically to an improved process and apparatus for destroying such materials wherein an electrolytically regenerable liquid stream which is capable of oxidizing pollutant materials is subjected to a crystallization, either periodic or continuous, to precipitate materials therefrom which are not totally oxidized and which accumulate in the liquid stream.

Description of the prior art

Processes and apparatus are known to the prior art for crystallizing various materials from liquid streams. The concept of crystallization is, of course, well known to the art. However, in the pollution control processes and apparatus systems of the prior art, it has never been appreciated that, in a process involving the electrolytic regeneration of a liquid stream capable of oxidizing pollutant impurities, the efficiency and operating capability of such a system could be expanded by providing a crystallization step in such processes, whereby materials which would otherwise accumulate in the liquid stream capable of oxidizing the pollutant impurities can be removed therefrom.

For instance, U.S. Pat. No. 3,408,157 Miller et al. discloses a process for the recovery of ammonium salts, including ammonium bisulfate, from an aqueous stream which results from the manufacture of acrylonitrile by the vapor phase catalytic oxidation of propylene in the presence of ammonia. A mineral acid is added to the off-stream from the acrylonitrile processing, this stream is then heated to a temperature of 250 to 600° F. to form a slurry, and solid is separated from the liquid phase of the slurry. The liquid phase is concentrated by removing water therefrom and ammonium sulfate and ammonium bisulfate are crystallized from the concentrated solution.

U.S. Patents 2,805,125 Van Ackeren and 2,599,067 Otto both disclose processes for the manufacture of ammonium sulfate comprising scrubbing a coke oven gas containing ammonia with a sulfuric acid solution and crystallizing the ammonium sulfate from the resulting stream.

SUMMARY OF THE INVENTION

A process for removing pollutant impurities and destroying oxidizable pollutant impurities from a gas stream which comprises contacting the gas stream with an electrolytically regenerable liquid stream capable of oxidizing the oxidizable impurities in the gas stream, the contacting insuring good mass transfer of the impurities from the gas stream to the electrolytically oxidizable liquid stream, separating the gas stream with a lower pollutant impurity content from the electrolytically regenerable liquid stream and electrolytically regenerating the liquid stream to thereby restore the oxidizing capability of the liquid stream. The specific improvement of the present invention comprises subjecting the electrolytically regenerable liquid stream, on a periodic or continuous basis, to a crystallization whereby pollutant impurities which are not completely oxidized in the process, and which accumulate in the electrolytically regenerable liquid stream, can be precipitated therefrom. The electrolytically regenerable liquid stream can be removed and returned to the point active pollution control process flow path at any point.

Typically, oxidation products of nitrogenous impurities accumulate in the electrolytically regenerable liquid stream in the form of ammonium ions, e.g., as ammonium bisulfate.

A preferred electrolytically regenerable liquid stream comprises a mineral acid, e.g., sulfuric acid, and an oxidizing agent, which is capable of oxidizing pollutant impurities, and, of course, which is capable of being electrolytically regenerated to a state where it is again capable of oxidizing further pollutant impurities.

A preferred liquid stream which is capable of oxidizing pollutant impurities comprises a mineral acid, e.g., sulfuric acid, stream containing a variable valence metal in ionic form, preferably, cobalt in the +3 valence state.

Apparatus in accordance with the present invention comprises the following elements, in combination:

(a) Contacting means for insuring good mass transfer between the gas stream containing the pollutant impurities and the liquid stream capable of oxidizing the impurities therein;

(b) Electrolytic regeneration means for restoring the liquid stream to its original oxidizing capability; and (c) Crystallization means, most preferably low temperature crystallization means, whereby materials which are not totally oxidized in the process of this invention and which accumulate in the liquid stream can be precipitated therefrom.

If the material to be crystallized is permitted to accumulate, precipitation can occur throughout the apparatus of the present invention, whereby pumping means can be destroyed, contacting efficiency lowered, and damage can occur to the electrolytic regeneration means.

Destruction of pollutants also occurs at the electrodes of the electrolytic regeneration means during regeneration.

It is thus one object of the present invention to provide an improved process for the removal of pollutant impurities and the destruction of oxidizable pollutant impurities carried in a gas stream.

It is a further object of the present invention to provide an improved process for the destruction of oxidizable pollutant and/or odorous materials from a gas stream by means of a liquid stream capable of oxidizing said pollutant and/or odorous impurities, wherein the full oxidizing capability of the liquid stream is continuously promoted by electrolytic regeneration, and further wherein pollutant impurities which are not totally oxidized in the process and which accumulate in the liquid stream, are removed therefrom by subjecting said liquid stream to a crystallization on a periodic or continuous basis, preferably, a low temperature crystallization.

It is another object of the present invention to provide improved apparatus for the destruction of oxidizable pollutant and/or odorous impurities carried in a gas stream comprising in combination, gas-liquid contact means, electrolytic regeneration means for regenerating a liquid stream capable of oxidizing the oxidizable pollutant and/or odorous impurities, and crystallization means whereby pollutant impurities which are not totally oxidized in said process, and which accumulate in the liquid stream, are removed therefrom, the crystallization means, preferably, being low temperature crystallization means.

It is still another object of the present invention to provide an improved process and improved apparatus for the destruction of oxidizable pollutant and/or odorous impurities carried in a gas stream wherein oxidation of the pollutant and/or odorous impurities also occurs at the electrodes of the electrolytic regeneration means.

These and other objects of the present invention are explained in greater detail in the following material.

DESCRIPTION OF THE PREFERRED EMBODIMENTS

Figure 1:
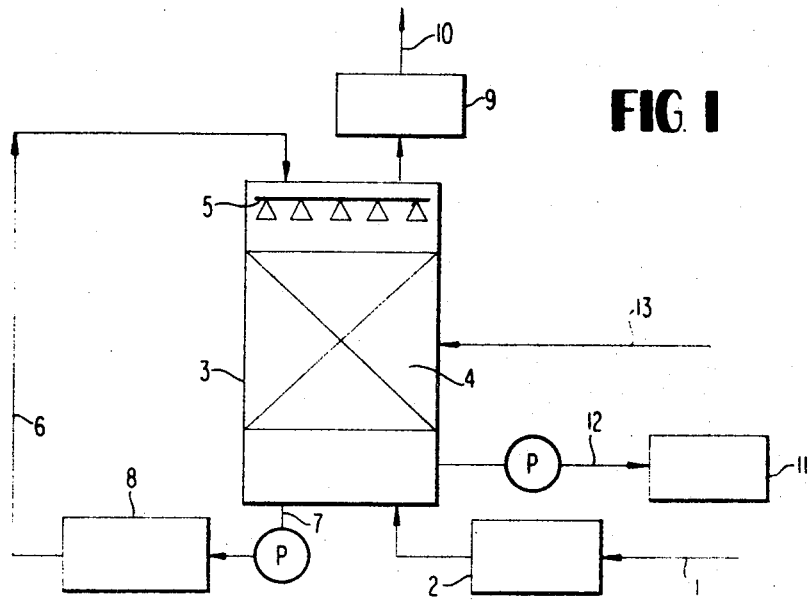
FIG. 1 is a schematic representation of the processing steps and the apparatus used in the present invention.

The present application provides an improvement in the processes described in copending U.S. Ser. No. 69,804, filed Sept. 4, 1970, in the names of E. Zabolotny, P. Chang and W. Biermann and entitled, "Process and Apparatus for Removing Pollutants from Gas Streams," and copendign U.S. application Ser. No. 69,805, filed Sept. 4, 1970, in the name of E. Zabolotny and entitled, "Process and Apparatus for the Electrolytic Destruction of Pollutants." The disclosures of these two applications are hereby incorporated by reference.

The present process is basically directed towards the removal of pollutant impurities and the destruction of oxidizable pollutant and/or odorous impurities (hereinafter these terms will be used interchangeably) carried in a gas stream, preferably an air stream. Destruction of the pollutants is accomplished by two means. Firstly, pollutant impurities are oxidized by an electrolytically regenerable liquid stream capable of oxidizing the impurities. Secondly, destruction of pollutant materials will occur at the electrodes of electrolytic regeneration means used in the present invention.

From a process aspect, the present invention comprises the steps of contacting the gas stream containing the impurities (hereinafter referred to as the gas stream) with an electrolytically regenerable liquid stream capable of oxidizing the oxidizable pollutant impurities in the gas stream (hereinafter the electrolytically regenerable liquid stream capable of oxidizing the pollutant impurities will be referred to as the liquid stream). The purpose of contacting is to insure good mass transfer of pollutant impurities into the liquid stream. For this purpose, any state of the art gas-liquid transfer means may be used, such as packed beds, be they co-current, countercurrent, etc., spray towers, be they baffled, unbaffled, partially packed, etc., centrifugal contact means, plate towers, fluidized beds, orifice scrubbers, venturi ejectors, etc. Combinations of the above can also be used, and the design of such units to accomplish the requisite degree of mass transfer will be obvious to one skilled in the art and the present invention is not meant to include the design of such units.

In the contact means, pollutant impurities will be removed from the gas stream by a homogeneous and a heterogeneous transfer. By homogeneous transfer is meant that the impurities will generally be absorbed into the interior of the liquid stream. Such would include soluble impurities. By heterogeneous transfer is meant that the impurities are "impacted" or adsorbed onto the surface of the liquid stream. Such would occur with more insoluble impurities. Destruction of pollutant impurities will occur by both a homogeneous and heterogeneous mechanism, with the homogeneous mechanism accounting for the greatest amount of pollutant destruction.

For purposes of the following discussion, the contact means used will be a packed bed. The liquid oxidizing stream is sprayed over the packed bed and trickles over the packing, which can be of any state of the art type, where it is contacted by an upflowing gas stream in countercurrent flow.

After contacting, the cleansed gas stream is removed from the packed bed, demisted if desired to remove any liquid carried over from the packed bed, and vented to any desired area. The liquid stream, which has both absorbed and adsorbed pollutant impurities therein, is also removed from the packed bed.

Before entering into a discussion of the next step, it is appropriate to briefly discuss and define the terms "gas stream" and "liquid stream."

The gas stream treated in accordance with the present invention can be any stream containing pollutant or odorous impurities which can be oxidized by the liquid stream. The pollutant materials can be organic and inorganic, for instance, formaldehyde and hydrogen sulfide. As long as the pollutant material can be oxidized by the liquid stream, it is amenable to processing in accordance with this invention. Pollution materials which are good reducing agents will be more easily oxidized. The exact rate of oxidation of any one specific pollutant material can only be determined experimentally, though with similar pollutant materials some prediction is possible.

The liquid stream used in accordance with the present invention must be one which can oxidize the required amount of pollutant impurities, for example to carbon dioxide, and which is electrolytically regenerable. The liquid stream always contains water, i.e., it is aqueous. This is because water serves as the source of oxygen for the oxidation process. Preferred liquid streams comprise inorganic acids, such as mineral acids, and most preferred liquid streams comprise mineral acids containing an electrolytically regenerable metal in ionic form. Preferred mineral acids are sulfuric, phosphoric and perchloric, and preferred metals in ionic form are cobalt, chromium, cerium, silver, and manganese. The metals in ionic form are always carried in a liquid stream which is an aqueous acid stream. The pH of the liquid stream of this invention is preferably less than 1. In addition to illustrating a capability for oxidizing the pollutant materials carried in the gas stream, the liquid stream must be electrolytically regenerable. For this reason, the liquid stream, which is always aqueous and acidic at preferably a pH less than 1, cannot have an acidity so high as to prohibit electrolytic regeneration. While the maximum acidity will vary for different acids, generally a 27.5 N acid stream is the maximum operable. The preferred liquid stream comprises cobalt in the +3 valence state carried in aqueous sulfuric acid at a pH less than 1 and a normality no greater than 27.5.

Since it is mandatory that the liquid stream, preferably containing a metal in ionic form, must be electrolytically regenerable, this term will now be further defined. A liquid stream which is electrolytically regenerable is one which, though its oxidizing capability becomes reduced through the destruction of pollutant or odorous impurities, can be continuously restored to its original oxidizing state by means of electrical current introduced into the liquid stream in an electrical cell. The liquid stream must not be irreversibly destroyed during the process.

Having thus defined the gas stream and the liquid stream used in the present invention, all of which are in accordance with the teachings of copending U.S. application Ser. Nos. 69,804 and 69,805, identified above, it is now appropriate to turn to the electrolytic regeneration of the present invention. Discussion of the electrolytic regeneration will be in terms of the preferred liquid stream of the present invention which comprises sulfuric acid at a pH less than 1 and at a normality no greater than 27.5 containing cobalt in the +3 valence state. The purpose of electrolytic regeneration is simply to restore the liquid stream to its original oxidizing state, that is, so that the liquid stream can be used to continuously oxidize or destroy the desired amount of pollutant impurities in the gas stream. Any state of the art means may be used to accomplish this electrolytic regeneration so long as it is resistant to the materials of the liquid stream which illustrate a strong oxidizing capability. An appropriate cell for regenerating the sulfuric acid/cobalt (III) stream is described in the example. Other equivalent electrolytic regeneration apparatus will be obvious to one skilled in the art from the example.

At the electrodes of the cell, some pollutant materials will be destroyed. The mechanism of destruction is not understood by the inventors. However, it is theorized that transient species such as $S_2O_8^{--}$, $H_2O_2$ and nascent oxygen are produced at the electrodes. These materials serve to oxidize many common pollutant or ordorous materials, such as, aniline, acetone, methanol, butylamine, acetic acid, etc. However, applicants do not wish to be bound by the above theory for the electrode destruction.

After electrolytic regeneration, the liquid stream illustrating its original oxidizing capability is recycled to the contact area.

It will be apparent to one skilled in the art that oxidation and destruction of oxidizable pollutant materials actually occurs at every point in the system, that is, the packed bed, the electrolytic regeneration cell, and in all process piping. It is necessary to regenerate the liquid stream so that the amount of metal ion oxidant produced during the electrolytic regeneration is equivalent to the amount consumed by the pollutant impurities. While greater amounts can be regenerated, and such are not harmful to the system, this would serve no useful purpose in oxidizing further impurities.

In a process such as above, a problem has been encountered due to the presence of certain types of materials. Specifically, materials which are present in the gas stream which are not totally oxidized can leave residues which accumulate in the liquid stream. These residues may precipitate therefrom and may cause the breakage of process equipment such as pumps, may reduce the efficiency of the contact means, and may accumulate in the electrolytic regeneration cell, thereby reducing the efficiency thereof.

For instance, in treating a gas stream from a rendering plant, it has been found that a high content of nitrogenous materials in the gas stream leads to an accumulation of ammonium ions in the liquid stream. Ammonium ions are not easily oxidized in accordance with the process of this invention, and hence they accumulate to a point where they are precipitated from the system, for the sulfuric acid/Co(III) system, in the form of ammonium bisulfate.

However, it shall be understood that the present invention is not limited to apparatus or a process dealing only with nitrogen compounds. On the contrary, the present invention finds application in treating any impurity which is not totally oxidized, which accumulates in a liquid stream as defined, and which can be precipitated therefrom by crystallization.

To overcome the above problems, applicants have discovered that it is possible to subject the liquid stream to a crystallization step, whereby materials such as ammonium ions can be precipitated therefrom in the form of ammonium bisulfate. Preferably, crystallization is on a periodic basis to avoid the necessity for cooling and heating of large amounts of the liquid stream, and most preferably, crystallization is a low temperature crystallization.

With reference to FIG. 1 of the drawing, apparatus for use in one embodiment of the practice of the process of this invention is schematically shown. The gas stream initially enters via conduit 1, passes through prefilter 2, and into the contact bed 3 which is packed with any appropriate packing 4. The Co(III)/sulfuric acid solution is introduced into the contact bed 3 from spray head 5 via conduit 6, where the Co(III)/sulfuric acid solution contacts the upflowing waste stream.

"Spent" Co(III)/sulfuric acid containing higher amounts of Co(II) is continuously withdrawn via line 7 and forwarded to electrolytic cell 8 wherein the solution is regenerated. Regenerated solution is continuously returned to the spray head 5 above the contact bed 3 via conduit 6.

The waste stream, after treatment, is passed through demisting apparatus 9 and removed via line 10 for venting to the atmosphere or return to the interior of a dwelling or the like.

Crystallization means is shown by numeral 11. On a periodic or continuous basis, a portion of the Co(III)/sulfuric acid stream can be withdrawn via line 12, subjected to crystallization, and returned to the main process flow path via line 13.

Figure 2:
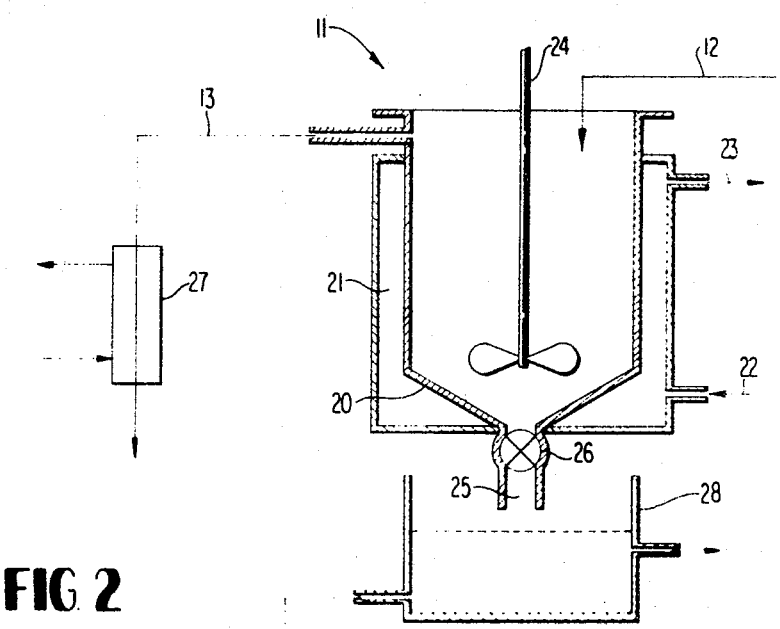
FIG. 2 is a schematic side sectional view of crystallization means which can be used in the present invention.

With reference to FIG. 2, where the same numerals as in FIG. 1 are used to denote the same items, the crystallizer 11 comprises a casing 20 through which the portion of the liquid stream being treated is introduced via line 12. Surrounding the casing space is a cooling jacket 21. Refrigerant is introduced to the cooling jacket via line 22 and withdrawn via line 23. An agitator 24 is provided in the center of the casing 20. The bottom portion of the casing 20 is cone-shaped to permit easier settling and removal of the crystals which are formed. At the bottom portion of the casing an exit conduit 25 is shown provided with a valve 26. After crystallization, the mother liquor is removed from the crystallizer via line 13, passed through a subsidiary heat exchanger 27, and returned to the main process flow path via line 13.

Vacuum filter 28 is shown to remove the crystals formed in the crystallizer 20.

The following example is offered to describe the functioning of the present invention in greater detail.

EXAMPLE 1

The waste stream treated in the present example flowed through the treating process at a rate of 2,000 c.f.m., was maintained at an initial temperature of 80° to 100° F., and contained 30 p.p.m. of odorous pollutants, consisting primarily of amines, aldehydes, ketones, organic acids, esters and amino acids. The waste stream was removed from the interior of a rendering plant.

Initially, as a high solids content was encountered, the waste stream was passed through a mesh prefilter wherein particulate solids were removed from the waste stream.

The contact apparatus per se comprised a glass reinforced polyester resin cylinder with an inner diameter of 30 inches containing a five foot deep packed bed of polypropylene packing. The waste stream, after prefiltering, was injected into the bottom of the contact tower, passed through a supporting mesh which supports the packing, and was passed in countercurrent flow with a downflowing Co(III)/sulfuric acid stream. In this example, the temperature of operation was ambient temperature, and operation was at atmospheric pressure. Over the contact bed, for a 2000 c.f.m. waste stream, approximately 17 gallons total Co(III)/sulfuric acid solution was downflowed per minute, containing a total cobalt concentration of .1 M carried in approximately 45% sulfuric acid. Approximately 10% of the total cobalt content was Co(III). The Co(III)/acid solution was introduced into the packing from a spray nozzle over the packing. The residence time in the packed area was approximately one second. The waste gas exited from the packed bed, was passed through a demister to reduce the sulfuric acid concentration to .05 p.p.m., and vented to the atmosphere. Oxidizable pollutant impurities in the waste stream were converted to carbon dioxide and water and vented to the atmosphere with the waste stream. The Co(III)/sulfuric acid solution at the bottom of the packed bed contains a higher concentration of Co(II). This is removed from the contact bed and passed to electrolytic regeneration apparatus.

The electrolytic regeneration apparatus utilized comprised lead dioxide anodes and lead cathodes supported from a PVC coated copper support bar, and joined thereto by a 50—50 lead/tin solder. An anode area of 27,000–38,000 square centimeters was used in combination with an anode/cathode ratio of 20:1. An anode current density of $.8 \times 10^{-2}$ to $1.1 \times 10^{-}$ amps/cm.$^2$ and a cathode current density of .264 amp/cm.$^2$ was provided by a power supply of 300 amps. Regeneration was continuous. The Co(III)/sulfuric acid solution leaving the electrolytic regeneration cell was returned to the contact bed apparatus and again sprayed over the packing for oxidation of further odorous materials.

In the above process, ammonium ions accumulated in the sulfuric acid/cobalt (III) stream. These ammonium ions were in the form of ammonium bisulfate. Accordingly, it was necessary to periodically remove a portion of the liquid stream and to subject this portion to crystallization. The crystallization means used is shown in detail in FIG. 2.

While crystallization may be at any interval, for the above conditions, crystallization was performed weekly removing and treating approximately 5% of the liquid stream. Obviously, lesser amounts can be treated using a more frequent crystallization or greater amounts treated using a less frequent crystallization schedule.

The crystallizer used was a 20-gallon, jacketed, lead-lined steel pot having a 16-inch internal diameter. The refrigerant passed through the jacket was ethylene glycol, which maintained the contents of the crystallizer at 15° F. The agitator which was used minimized temperature and concentrational gradients, and improved heat and mass transfer in the liquid stream being crystallized. Of course, the agitator keeps smaller crystals in suspension which feed on the state of supersaturation induced by the cooling refrigerant passed through the jacket. The suspended crystals grow into larger crystals before they settle out in the cone-shaped bottom of the crystallizer casing. After cooling for a sufficient time to grow large crystals, the crystals are removed from the casing via the bottom conduit by flushing them out into the vacuum filter. The mother liquor portion of the liquid stream is passed through the subsidiary heat exchanger and returned to the main process flow line. The purpose of the subsidiary heat exchanger is to warm the mother liquor being returned to thereby cause any crystals which are carried over from the crystallizer to redissolve. This will avoid the possibility of any crystals plugging up this flow line.

It is necessary to add sulfuric acid in an amount equivalent to that drawn off as sulfate to maintain the volume of the solution.

One skilled in the art can easily determine the optimum temperature for any liquid stream/crystallized material combination by a few experimental runs. Further, the optimum frequency of crystallization will vary, depending upon the amount of crystallizable material carried in the liquid stream.

It is necessary to operate at a temperature and a cobalt sulfate concentration such that cobalt sulfate is not precipitated instead of or with ammonium bisulfate.

The pressure of crystallization is also non-critical, and is usually atmospheric, as in the example. The use of sub- or super-atmospheric pressures merely introduces a complicating factor which is generally unnecessary.

While the invention has been particularly shown and described with reference to preferred embodiments thereof, it will be understood by those skilled in the art that various changes in form and details may be made therein without departing from the spirit and scope of the invention.

What is claimed is:

1. In a process for removing odorous or pollutant impurities and destroying oxidizable odorous or pollutant impurities carried in a gas stream by contacting the gas stream containing the impurities with an electrolytically regenerable aqueous liquid stream containing a mineral acid and at least one electrolytically regenerable oxidizing agent comprising a multivalent metal selected from the group consisting of cobalt, chromium, cesium and manganese in ionic form which is electrolytically regenerable from a lower valence state to a higher valence state to transfer said impurities to said liquid stream to thereby oxidize the oxidizable impurities originally in the gas stream by the action of the electrolytically regenerable liquid stream, separating the gas stream containing a lowered impurities content from the liquid stream, electrolytically regenerating the liquid stream which exhibits a reduced oxidizing capability due to the oxidation of impurities so that said electrolytically regenerable liquid stream is regenerated for the oxidizing of additional oxidizable impurities, the specific improvement which comprises:

crystallizing from at least a portion of the electrolytically regenerable liquid stream oxidation products of said impurities which are not totally oxidized in the process and which accumulate in the electrolytically regenerable liquid stream and removing said crystallized impurities.

2. The process of claim 1 wherein said electrolytically regenerable liquid stream comprises a mineral acid at a pH less than 1 and a normality no greater than 27.5.

3. The process of claim 1 wherein at least one multivalent metal is cobalt regenerated from the cobalt (II) state to the cobalt (III) state during electrolytic regeneration.

4. The process of claim 1 wherein the electrolytically regenerable liquid stream contains sulphuric acid, and the electrolytically regenerable liquid stream is at a pH less than 1 and at a normality no greater than 27.5.

5. In a process for removing odorous or pollutant impurities carried in a gas stream by contacting the gas stream containing the impurities with an electrolytically regenerable aqueous liquid stream containing a mineral acid at a pH less than 1 and a normality no greater than 27.5 and at least one electrolytically regenerable oxidizing agent comprising at least one multivalent metal in ionic form which is electrolytically regenerable from a lower valence state to a higher valence state to transfer said impurities to said liquid stream to thereby oxidize the oxidizable impurities originally in the gas stream by the action of the electrolytically regenerable liquid stream, separating the gas stream containing a lowered impurities content from the liquid stream, electrolytically regenerating the liquid stream which exhibits a reduced oxidizing capability due to the oxidation of impurities so that said electrolytically regenerable liquid stream is regenerated for the oxidizing of additional oxidizable impurities, the specific improvement which comprises:

crystallizing from at least a portion of the electrolytically regenerable liquid stream oxidation products of nitrogenous impurities which are not totally oxidized in the process and which accumulate in the electrolytically regenerable liquid stream by lowering the temperature of the electrolytically regenerable liquid stream to cause crystallization of the odorous or pollutant impurities which are not totally oxidized in the process and removing said crystallized impurities.

6. A process according to claim 5 including the step of agitating the portion of the electrolytically regenerable liquid stream undergoing crystallization to maintain smaller crystals in suspension while cooling the liquid stream to grow larger crystals which are precipitated from the electrolytically regenerable liquid stream.

7. A process according to claim 5 including the steps of precipitating large crystals from the electrolytically regenerable liquid stream and removing the precipitated crystals from the electrolytically regenerable liquid stream.

References Cited

UNITED STATES PATENTS

| | | | |
|---|---|---|---|
| 3,401,101 | 9/1968 | Keller | 204—136 |
| 3,408,157 | 10/1968 | Miller et al. | 23—100 |
| 2,599,067 | 6/1952 | Otto | 23—260 |
| 1,034,646 | 8/1912 | Rabenalt | 204—130 |
| 996,705 | 7/1911 | Cross | 204—130 |

FOREIGN PATENTS

| | | | |
|---|---|---|---|
| 682,411 | 3/1964 | Canada | 204—130 |
| 892,506 | 1/1963 | France | 204—130 |

JOHN H. MACK, Primary Examiner

R. L. ANDREWS, Assistant Examiner